(12) United States Patent
Hormann et al.

(10) Patent No.: US 6,482,124 B2
(45) Date of Patent: Nov. 19, 2002

(54) APPARATUS FOR ENABLING TRUCK POWER TAKE OFF FUNCTIONALITY DURING AUTO NEUTRAL

(75) Inventors: Matthew W. Hormann, Ft. Wayne, IN (US); John Jacob, Ft. Wayne, IN (US); William E Copeland, Ft. Wayne, IN (US); Michael L. Shoemaker, Ft. Wayne, IN (US); Brian P. Marshall, Ft. Wayne, IN (US); Daniel L. Hilaire, Ft. Wayne, IN (US); Barry J. Coe, Grabill, IN (US); Christopher M. Beiring, Ft. Wayne, IN (US); Ronald L. Blanchard, Ft. Wayne, IN (US); Kimberly D. Foster, Albion, IN (US); Shawn E. Beverly, Ft. Wayne, IN (US); Charles D. Elliot, Alfred Station, NY (US)

(73) Assignee: International Truck Intellectual Property Company, L.L.C., Warrenville, IL (US)

( * ) Notice: Subject to any disclaimer, the term of this patent is extended or adjusted under 35 U.S.C. 154(b) by 0 days.

(21) Appl. No.: 09/922,563

(22) Filed: Aug. 3, 2001

(65) Prior Publication Data

US 2002/0070064 A1 Jun. 13, 2002

Related U.S. Application Data

(60) Provisional application No. 60/223,637, filed on Aug. 8, 2000.

(51) Int. Cl.$^7$ .............................................. F16H 59/74
(52) U.S. Cl. ....................................................... 477/99
(58) Field of Search ...................................... 477/99, 92

(56) References Cited

U.S. PATENT DOCUMENTS

| | | |
|---|---|---|
| 3,565,220 A | 2/1971 | Lammers et al. |
| 3,966,254 A | 6/1976 | Guhl et al. |
| 4,051,915 A | 10/1977 | Behrens |
| 5,190,118 A | 3/1993 | Yelton |
| 5,212,896 A | 5/1993 | Hillard et al. |
| 5,401,222 A | 3/1995 | Wied et al. |
| 5,460,581 A | 10/1995 | Ueda |
| 5,514,048 A | 5/1996 | Jacobson et al. |
| 5,778,330 A | 7/1998 | McKee |
| 5,860,499 A | 1/1999 | Onimaru et al. |
| 6,022,291 A | 2/2000 | Weddle |
| 6,258,008 B1 | 7/2001 | Tabata et al. |

FOREIGN PATENT DOCUMENTS

JP  401215631 A  8/1989

*Primary Examiner*—Dirk Wright
(74) *Attorney, Agent, or Firm*—Jeffrey P. Calfa; Neil T. Powell; Dennis Kelly Sullivan (57) ABSTRACT

The invention provides an apparatus for installation on a vehicle having an automatic transmission , a gear select lever, an engine, and an engine cranking motor, which allows operation of an auxiliary system by the engine when the automatic transmission is in neutral regardless of the position of the automatic transmission gear select lever and cranking of the engine when the gear select lever for the automatic transmission is positioned at neutral.

8 Claims, 9 Drawing Sheets

APPARATUS FOR ENABLING TRUCK POWER TAKE OFF FUNCTIONALITY DURING AUTO NEUTRAL

REFERENCE TO RELATED APPLICATION

This patent is related to and claims domestic priority based on provisional patent application Ser. No. 60/223,637, filed Aug. 8, 2000.

BACKGROUND OF THE INVENTION

1. Field of the Invention

The present invention relates to motor vehicles and more particularly to auxiliary systems installed on a vehicle requiring increased vehicle engine power output for operation.

2. Description of the Problem

Contemporary trucks are often equipped with auxiliary systems that require increased engine output for operation. Examples of such auxiliary equipment are high output water pumps on fire trucks and trash compacting equipment on refuse collection vehicles. Trucks equipped with such auxiliary systems may therefore come equipped to support power takeoff operation (PTO) at the election of the driver or operator. Driver/operator control of PTO is often by a remote switch. By the term "remote" it is meant that such a switch is located on the vehicle away from the driver's normal position in the cab.

Although some vehicles are set up for mobile PTO, more commonly an engine controller requires that the vehicle's automatic transmission, if the vehicle is so equipped, be in neutral. Automatic transmissions are designed to be in neutral when a shift lever is in the neutral position. Transmission controllers can cause automatic transmissions to assume a neutral state under other conditions, for example when auto neutral operation is selected and the park brake is set, regardless of the position of the shift lever. Popular transmission controllers provide an indication both of when the transmission shift lever is positioned in neutral and when the transmission is in neutral (regardless of shift lever position). However, commercial vehicle regulations require explicit indication of shift lever position in neutral before allowing engine cranking. Since permission for engine cranking is controlled by an engine controller, common practice has been to tie the shift lever position indicative signal to the engine controller on a driveline disengage signal input pin. However, use of this port to indicate lever position leaves no avenue for telling the engine controller of other circumstances when the transmission is in neutral and PTO operation is allowable.

Under certain circumstances, the transmission may in fact be in neutral when the engine is running and the shift lever is not positioned in the neutral position. While under such circumstances cranking is neither permissible nor desirable, a driver/operator could be allowed to activate PTO. An automatic transmission that can move to neutral without repositioning the shift lever would be convenient for operators using PTO. What is needed is a PTO system which restricts engine cranking to circumstances where a transmission gear select shift lever has been moved to neutral, but allows PTO when the transmission is in neutral, regardless of shift lever position.

SUMMARY OF THE INVENTION

According to the invention there is provided an apparatus for installation on a vehicle having an automatic transmission, a gear select lever, an engine, and an engine cranking system, which allows operation of an auxiliary system by the engine when the automatic transmission is in neutral, regardless of the position of the automatic transmission gear select lever, and cranking of the engine when the gear select lever for the automatic transmission is positioned at neutral. The apparatus provides a selection mechanism independent of the transmission gear select lever for placing the automatic transmission in a neutral state independent of the position of the gear select lever. A transmission controller provides for generation of a signal indicating the state of the automatic transmission. Further provided are a source for a signal indicating the position of the gear select lever. An independent source of a request signal for increased engine power output for power takeoff operation is connected to an engine controller. The engine controller provides fuel flow control to the engine for setting power output in response to the state of the request signal for increased engine power output and further in response to the signal state on a driveline disengage signal input. A relay connected to the means for generating a signal indicating automatic transmission state for setting a driveline disengage signal. The engine controller is further responsive to the driveline disengage signal for setting a engine crank inhibit signal level. A crank inhibit relay responsive to appropriate states of the engine crank inhibit signal and the signal indicating the position of the gear select lever provides for enabling engine cranking.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
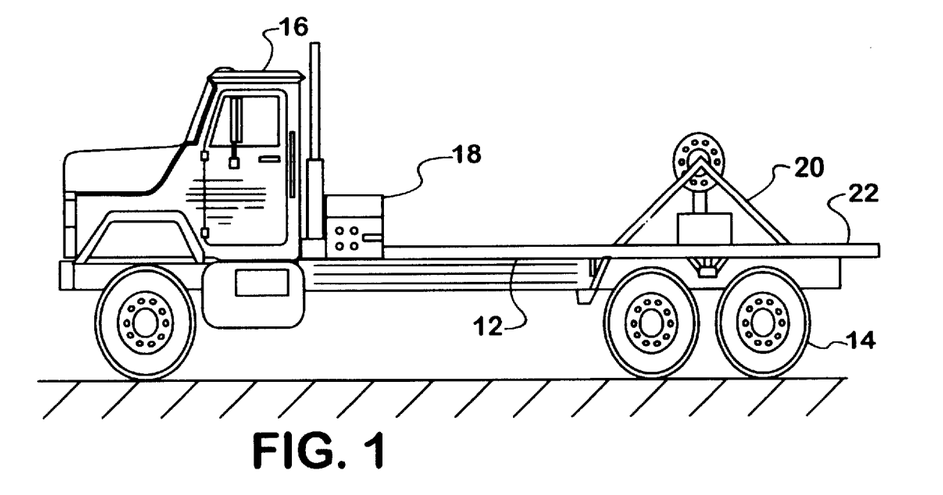
FIG. 1 is a side elevation of a truck on which an auxiliary system has been installed.

Referring now to the figures and particularly to FIG. 1, a preferred embodiment of the invention will be described. In the figure a conventional flat bed truck 12 rides on a plurality of wheels 14. A driver usually controls the vehicle from a cab 16 positioned in the forward portion of the vehicle. An auxiliary system, here a wench 20, is positioned on the flat bed 22 over the rear wheels. The auxiliary systems may take a number of forms, with the shared characteristic being that increased power output from the vehicle is required to operate the system. This may take the form of a direct power takeoff from the vehicle, or more commonly, increased demand for electrical power from the vehicle battery and alternator. The wench 20 is controlled from a panel 18 mounted on the bed just behind cab 16. Panel 18 includes switches for selecting auto neutral and for requesting power take off operation to operate wench 20. While it is contemplated that the invention be applied to vehicles having internal combustion engines, it is not restricted to such vehicles.

Figure 2:
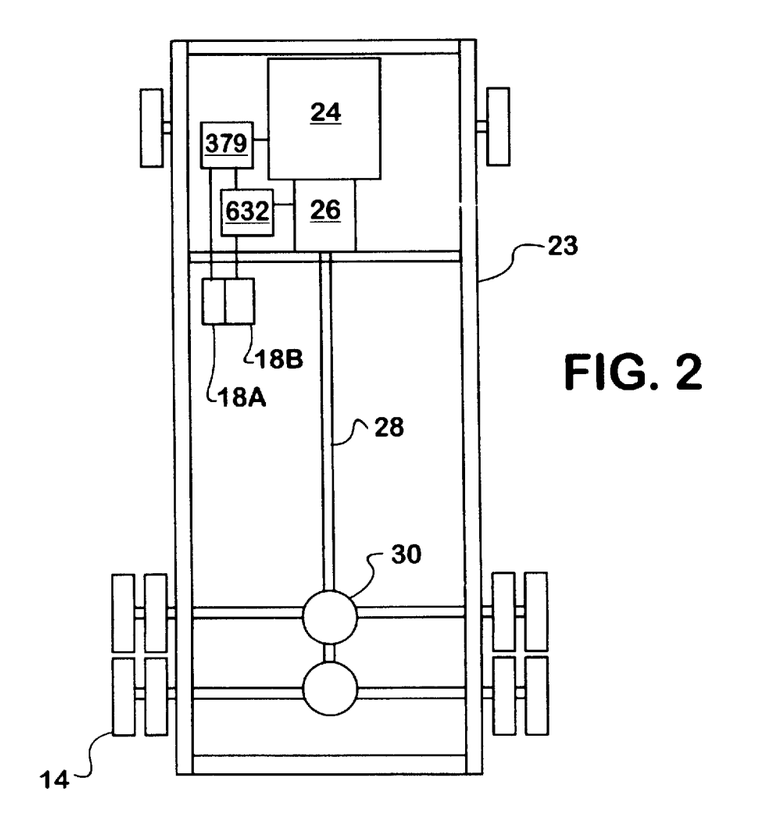
FIG. 2 is a top schematic of a truck chassis giving illustrative positions of major truck systems.

FIG. 2 illustrates the major vehicle systems involved in implementing the present invention. A thermal engine 24 is longitudinally mounted on the forward end of a chassis 23. Power from the engine is coupled through an automatic transmission 26 mounted to the aft end of the engine, which in turn drives a drive shaft 28 which is connected between the transmission and a forward differential 30 near the rear end of the chassis 23. Engine 24 is controlled by an engine electronic control unit (ECU) 379. The automatic transmission 26 is controlled by a transmission electronic control unit (TCU) 632. These receive input signals from and direct output signals to engine 24 and transmission 26, respectively. ECU 379 and TCU 632 communicate with a PTO request switch 18A and an auto neutral switch 18B, respectively. Switches 18A and 18B are part of control panel 18 and may be located remotely.

Figure 3:
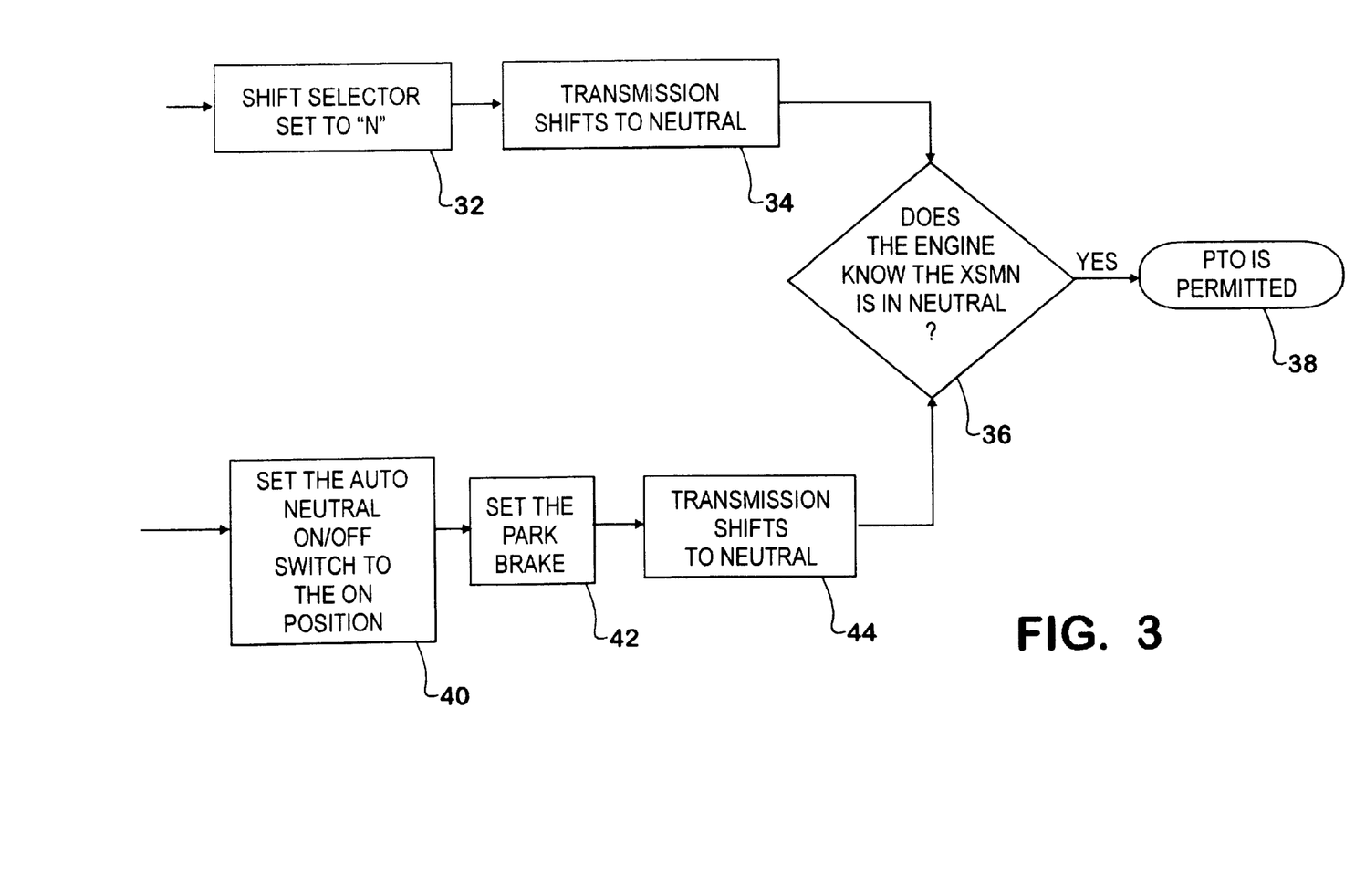
FIG. 3 is a high level flow chart illustrating activation of power takeoff operation.

FIG. 3 is a flow diagram illustrating two control paths along which permission for PTO is obtained. In the prior art the shift selector is moved to neutral at step 32. Subsequently, the transmission shifts to neutral, step 34. Movement of the transmission to neutral is detected at step 36 and PTO is allowed if invoked (step 38). The invention adds an alternative route. First an auto neutral switch is moved to On (step 40). Optionally, it may be required that the park brake be set (step 42). The transmission assumes the neutral state without movement of the gear select lever (step 44). Movement of the transmission to neutral is detected at step 36 and again PTO becomes permissible (step 38).

Figure 4:
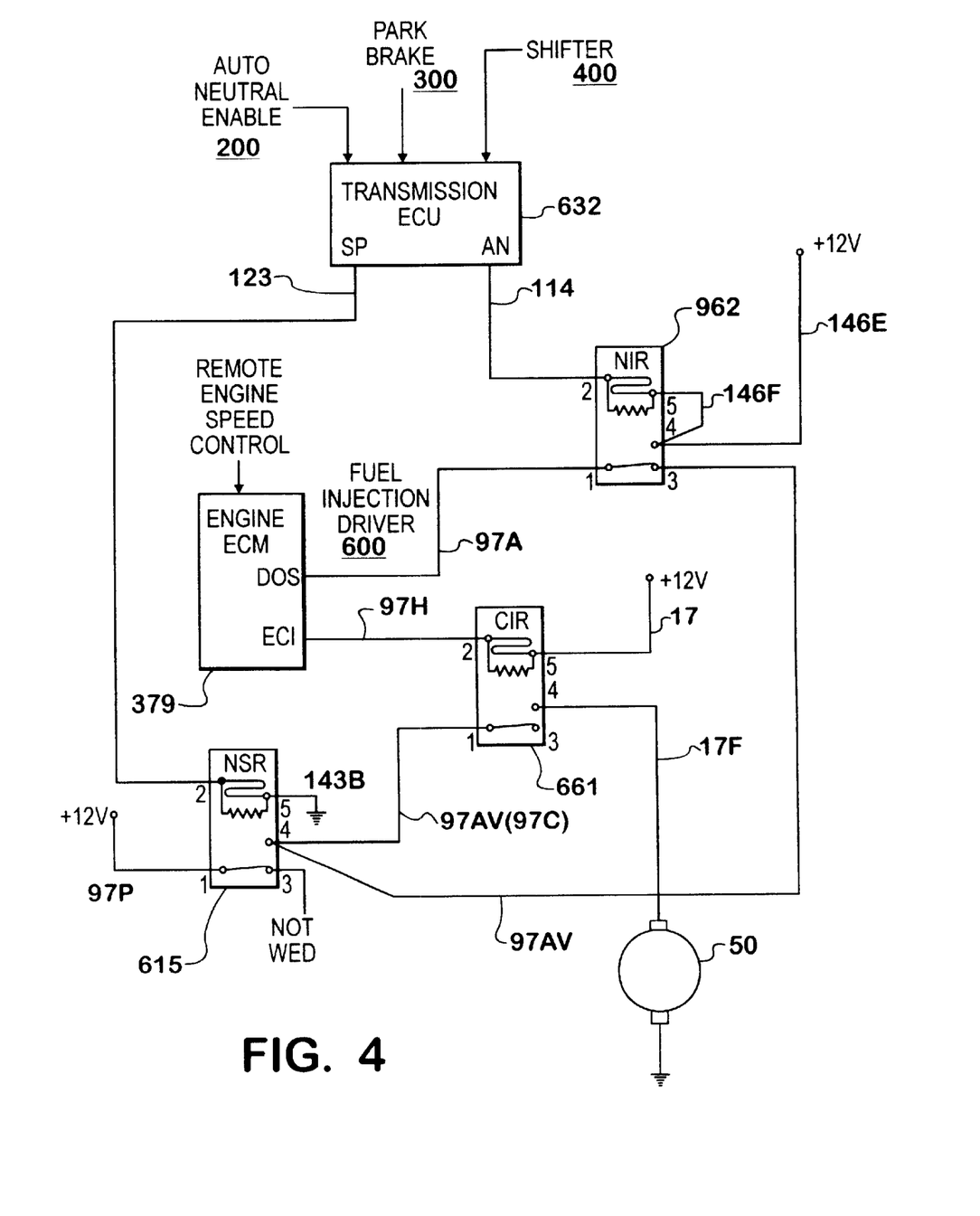
FIG. 4 is a consolidated, simplified circuit schematic illustrating a preferred embodiment of the invention.

FIG. 4 is a circuit schematic illustrating a preferred embodiment of the invention. The invention in a preferred embodiment provides a logical network for enabling PTO operation along the second path described above without compromising the requirement that the shift lever be in neutral before cranking is allowed. A transmission electronic control unit 632 is connected to receive an auto neutral enable input signal 200, a park brake set signal 300 and a shift lever position signal 400. TCU 632 provides two output signals utilized by the preferred embodiment, a shifter position signal on SP line 123 and an transmission state or auto neutral signal on AN line 114. It should be noted that AN line 114 is active only if the engine is running. The signal on AN line 114 indicates a transmission neutral state, when the engine is running, in response to movement of the shifter 400 to neutral or in response to setting of the auto neutral enable 200. Auto neutral enable may additionally require that the vehicle park brake 300 be set before indicating that the transmission is in neutral. SP line 123 is connected to and controls a neutral state relay (NSR) 615 which connects output lines 97AU and 97AV to a +12 volt source when the signal on line 123 is high, indicating that the shift lever is in the neutral position.

Line 97AV is connected to one terminal of a neutral indicator relay (NIR) 962. One control input of NIR 962 is connected to AN line 114. AN line 114 is functional when the vehicle's engine is running and can function as a sink to indicate that the transmission is in neutral. NIR 962 is connected to a +12 volt source on pins 4 and 5 from line 146E and shunt 146F. NIR 962 is energized when pin 2 is pulled low on AN line 114 connecting pin 1 to pin 4 thereby pulling the driveline disengage signal pin (DDS) on engine electrical control unit (ECU) 379 high on line 97A. This serves as indication that the transmission is in neutral. Alternatively, the DDS pin may be pulled high if AN line 114 is open or in an high impedance state and line 97AV is high, which occurs if the engine is not running and the shift lever 400 has been moved to neutral for cranking. In effect, DDS receives an enabling input whenever: (1) the actual state of the transmission is neutral with the engine running; or, (2) if the neutral has been selected. An enabling input on the DDS pin allows the ECU 379 to respond to a remote engine speed control request 500 by directing increased fuel flow through the fuel injector drivers 600 to increase engine output.

Responsive to the state of the DDS pin, ECU 379 provides a sink or low signal on engine crank inhibit line 97H to a control the energization of crank inhibit relay (CIR) 661. Since this signal can be low (i.e. enabling) whether or not the transmission shifter 400 is in the neutral position, or the conditions for auto neutral enable have been met, it may not be used for its originally intended purpose of authorizing engine cranking. Instead the signal on line 97H controls energization of CIR 661. If the ECI signal on line 97H is low, current flows from a voltage source along line 17 to activate the relay by connecting pin 1 to pin 4 (i.e. line 17F to line 97AU). The signal on line 97AU is high if the shift select lever is actually in the neutral position, resulting in the signal on line 17F to go high which enables cranking by starter system 50.

Figure 5:
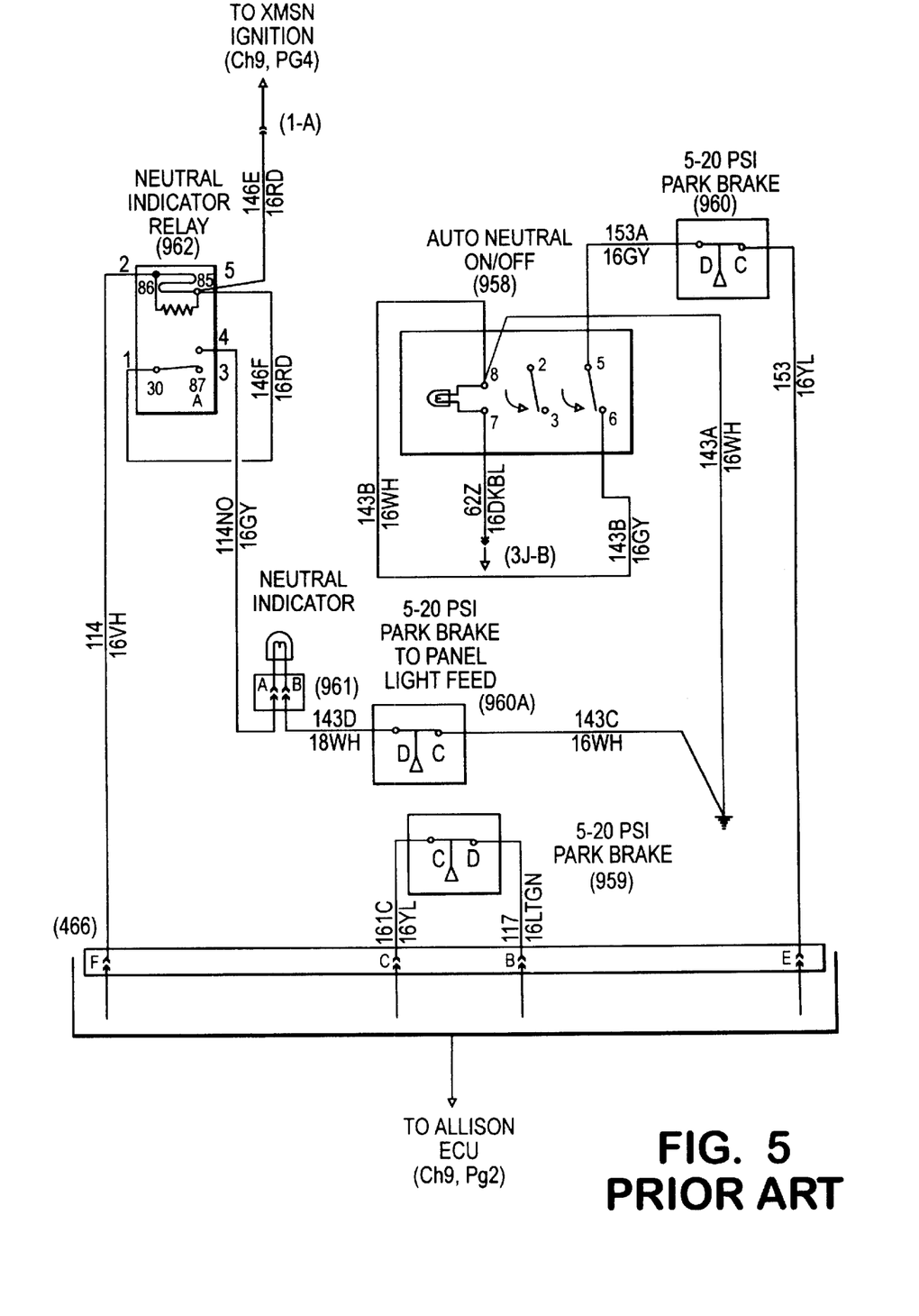
FIGS. 5–7 are circuit schematics of a prior art arrangement for controlling engine cranking depending upon the transmission state.
Figure 6:
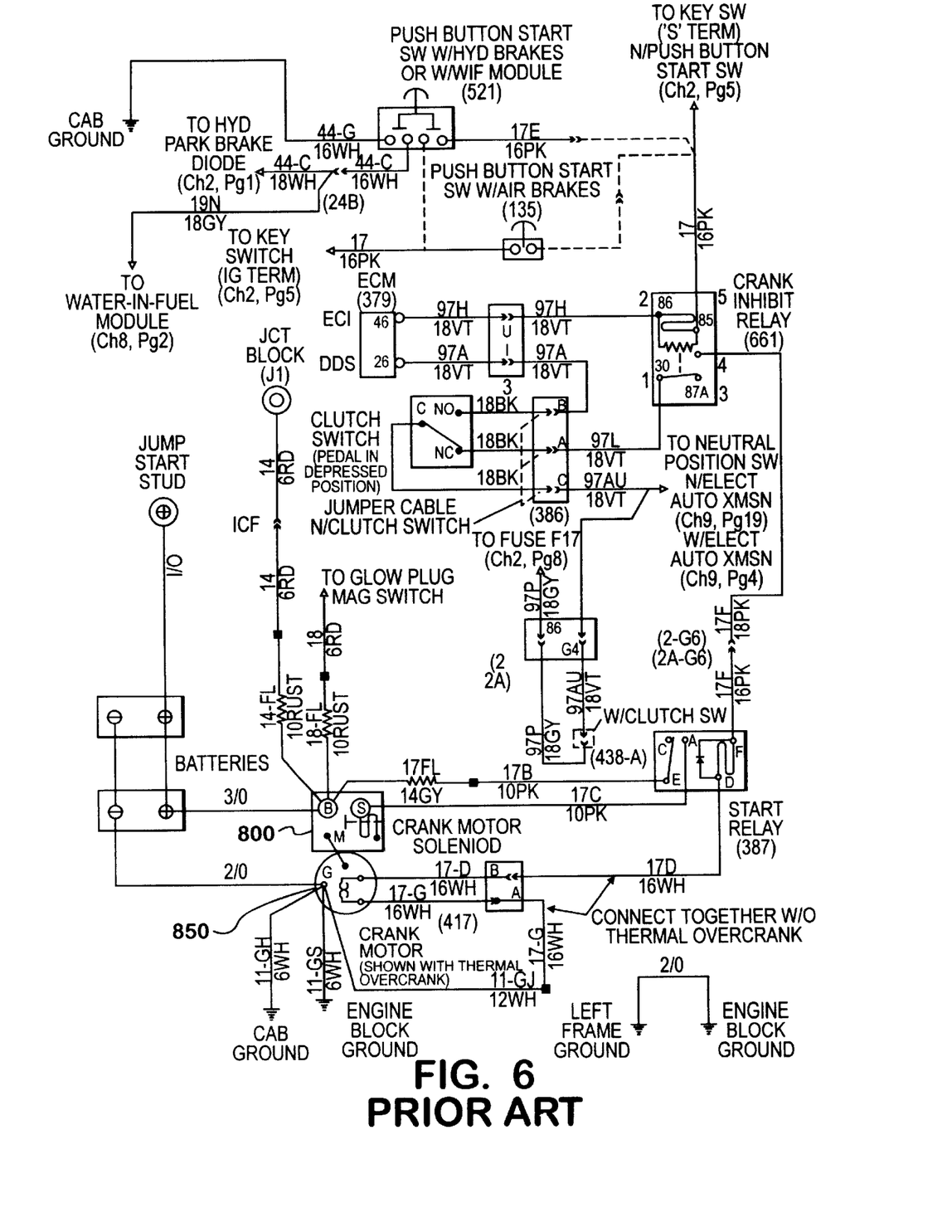
Figure 7:
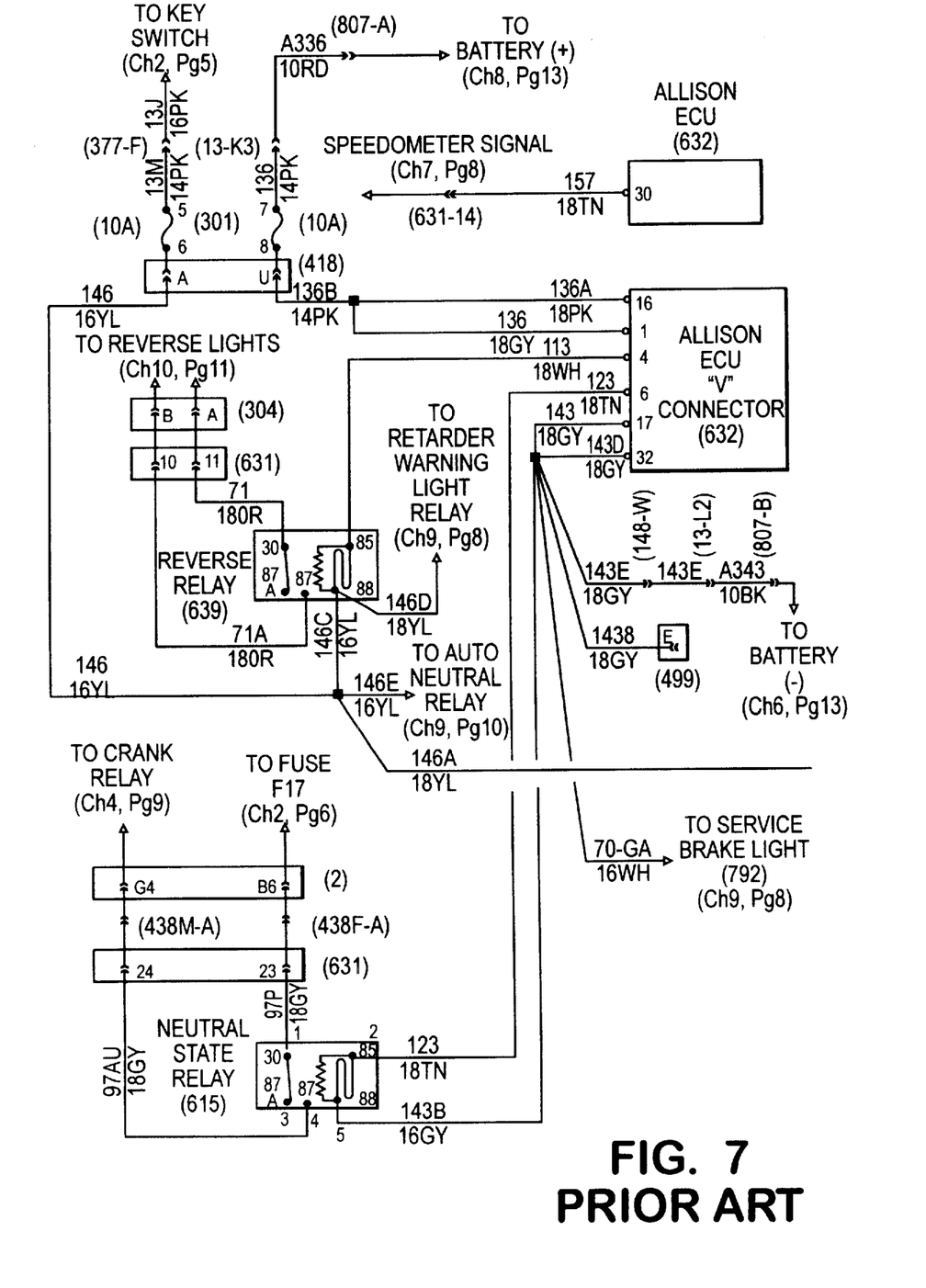

FIGS. 5–7 are illustrations of an auto neutral control system of the prior art which included the relays described in connection with FIG. 4 and is used with the popular Allison WTEC III automatic transmission. In the prior art the interconnections between the relays and between the relays and the engine and transmission controllers prevented PTO when the shift lever was not neutral. The circuits are not described in detail since much of the detail is not relevant to the invention. However, the interconnections of elements also found in FIG. 4 are described with like numerals referring to like elements. The differences in the way in which those elements are connected in the invention are compared. NIR 962 is illustrated in FIG. 5 as connected to receive the signals on AN line 114 on pin 2 as before, however, pin 5 is tied to pin 1 instead of to pin 4. Pin 3 floats instead of being connected to receive the signal on line 97AV indicating actual position of the shift lever. In effect, in the preferred embodiment, NIR 962 operates as an OR gate, taking as inputs the state of the transmission on pin 2 and the position of the shift lever on pin 3, and generating an output for the driveline disengage signal. In the prior art NIR 962 operates to illuminate a panel light.

FIG. 6 illustrates the position of CIR 661 and ECM 379. As before line 97H carries the engine crank inhibit signal from the engine crank inhibit (ECI) pin on ECM 379 to pin 2 of CIR 661. Pin 1 of CIR 661 is here connected to line 97L, which, in vehicles with automatic transmissions, is connected through to a jumper block 386 to lines 97A and 97AU and to the DDS pin on ECM 379. Pin 3 of CIR 661 floats in the prior art. Movement to the ON position of the ignition connects line 17F (through pin 4 of CIR 661) to line 97L with the result that the status level for the shifter is passed to start relay 387 whenever the electronic crank inhibit pin of ECM 379 is low. The ECI pin is low only when the signal on the DDS pin indicates that the shifter is in neutral. In contrast, in the preferred environment of the invention, the DDS pin of ECM 379 is not tied to pin 1 of the CIR 661 through jumper block 386 and the signal value on the DDS pin does not track the status of the shift lever. Pin 5 remains tied to a +12 volt source and pin 4 remains tied to the starter system in both the prior art and in the preferred embodiment. The starter system is here shown in greater detail including a start relay 387, a crank motor solenoid 800 and a crank motor 850.

FIG. 7 illustrates some of the outputs of an Allison WTEC III transmission controller, TCU 632 and a neutral state relay (NSR) 615. The connections to pins 1, 2, 3 and 5 of NSR 615 are identical here and in FIG. 4. Similarly, line 97AU from pin 4 is identically connected in both cases. However, the preferred embodiment adds a line 97AV from pin 4 of NSR 615 to pin 4 of NIR 962 as described above.

Figure 8:
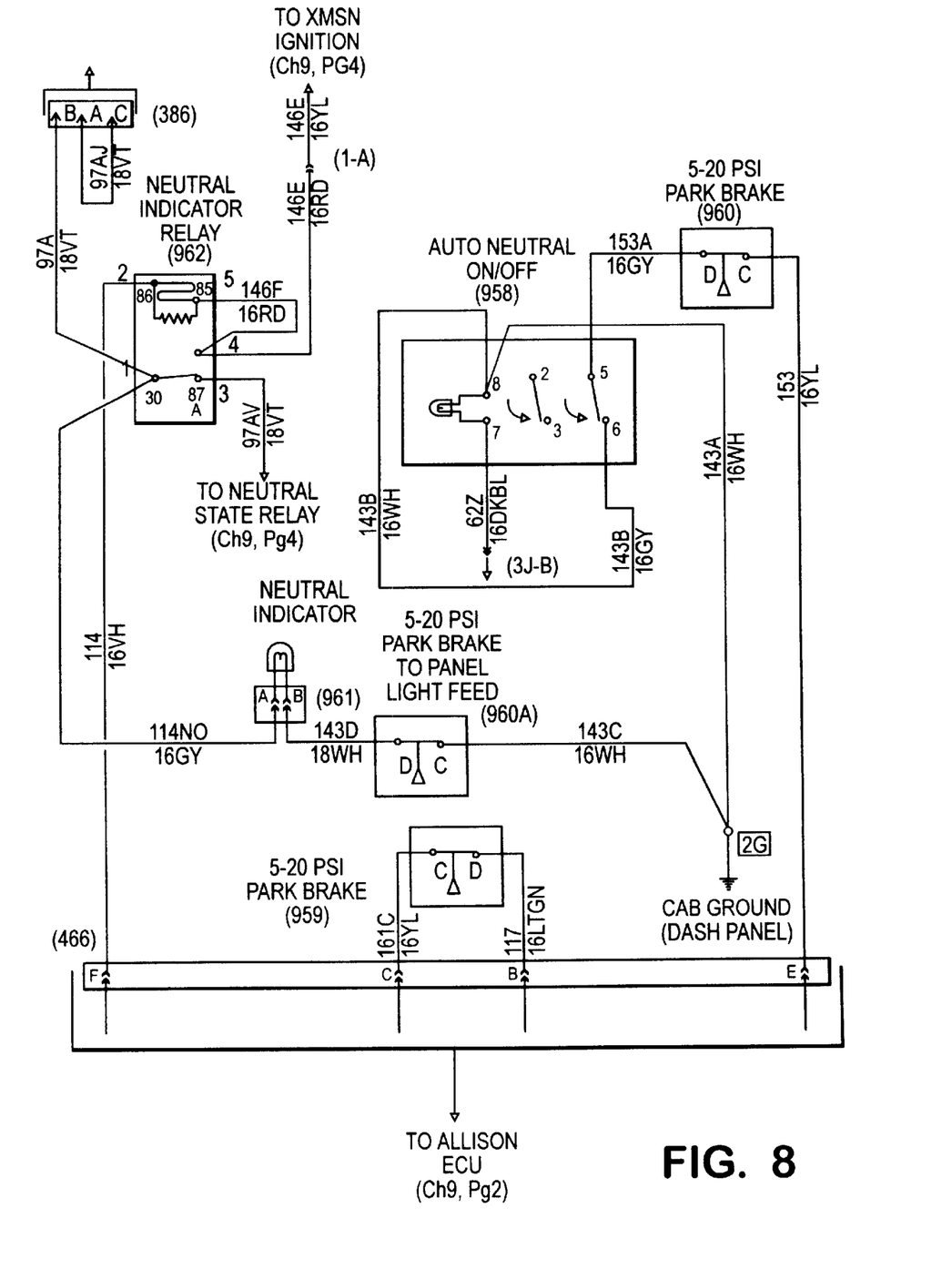
FIGS. 8–10 are detailed circuit schematics based on FIG. 4.
Figure 9:
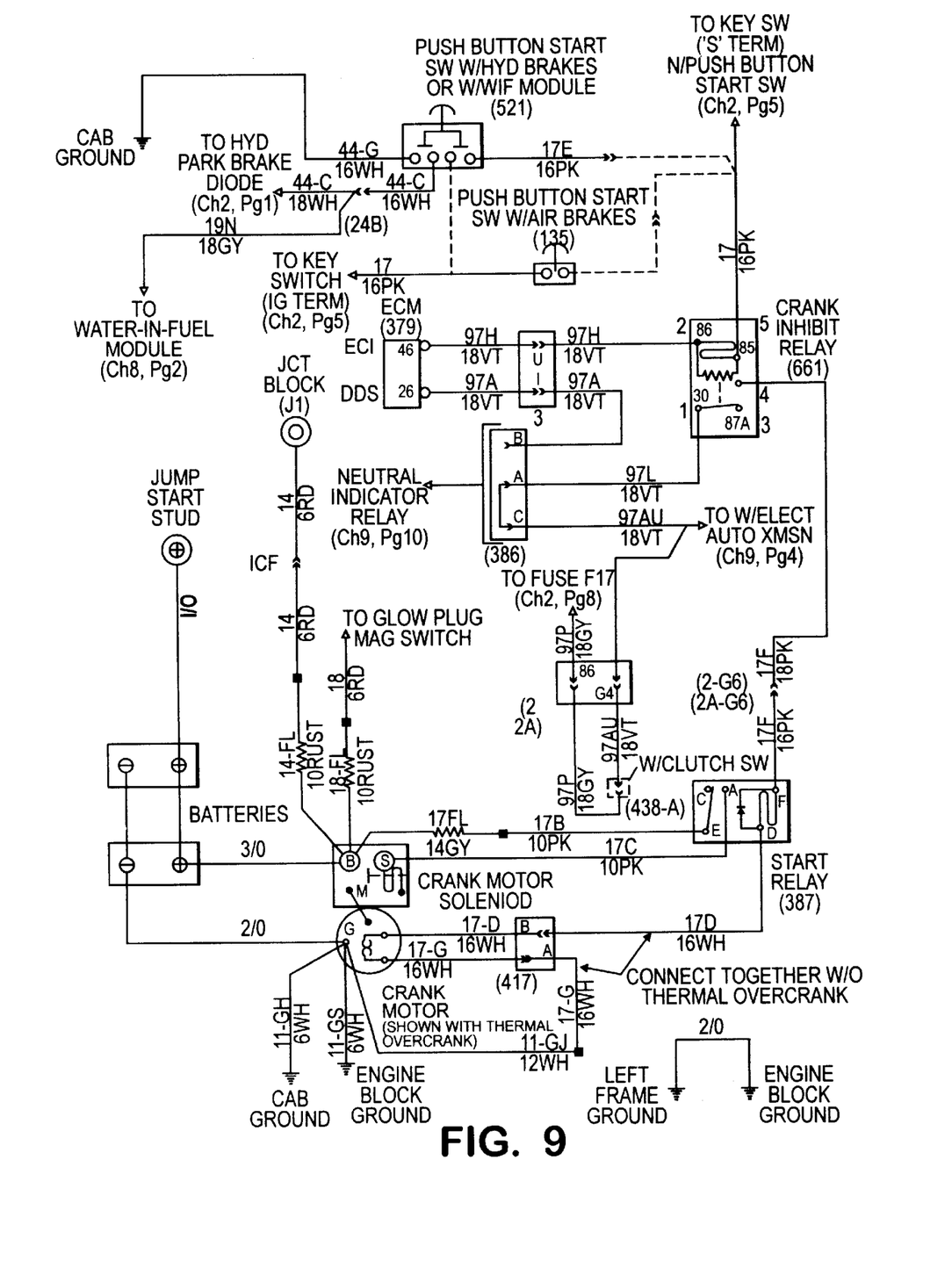
Figure 10:
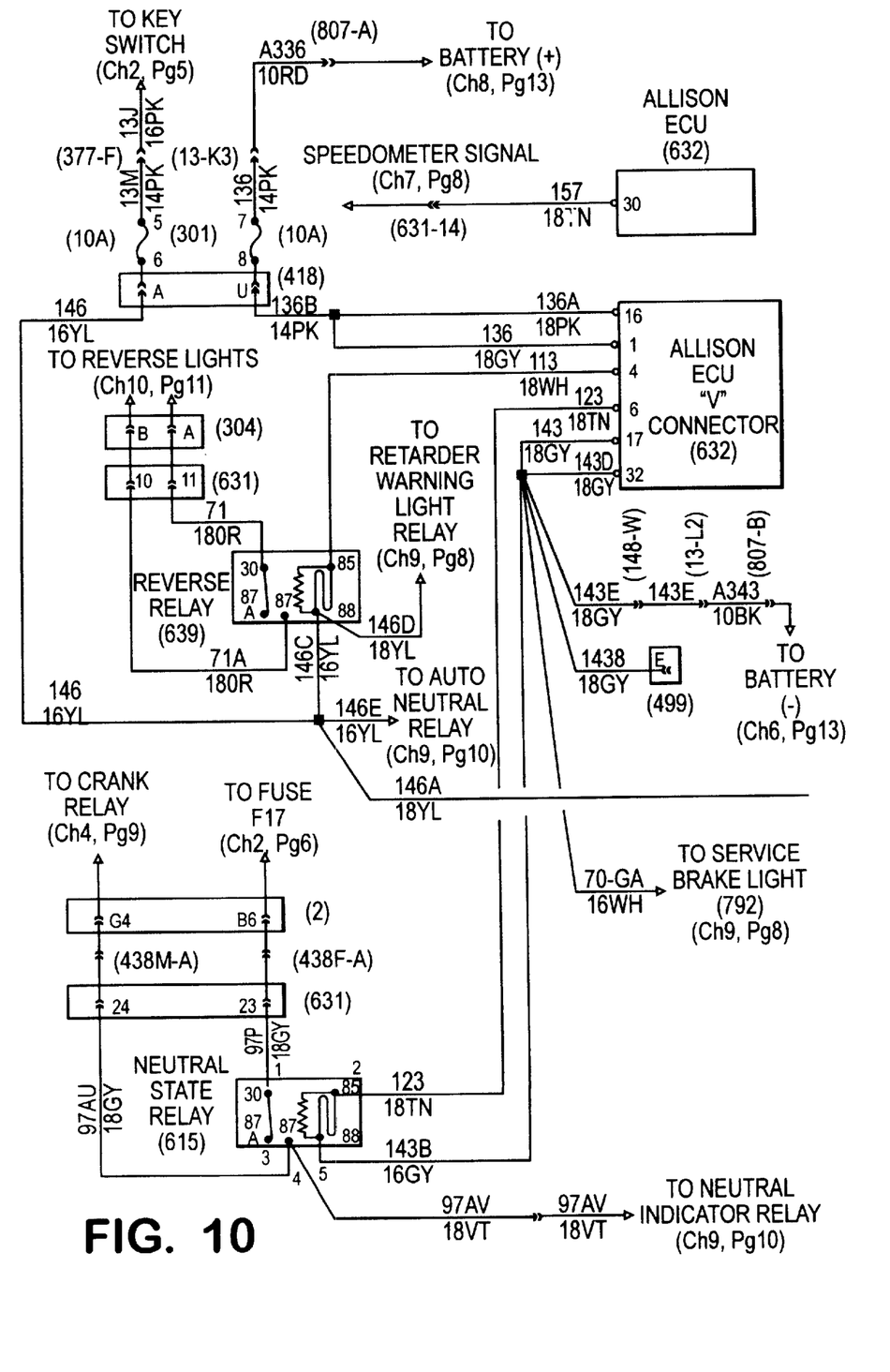

FIGS. 8–10 are detailed circuit schematics derived from FIGS. 5–7 illustrating the altered connections between relays and between relays and electronic control units implemented by the invention, giving greater detail to the basic implementation illustrated in FIG. 4. In FIG. 8 the shunt 146F between pins 4 and 5 of NIR 962 is shown. Output line 97A is connected from pin 1 of NIR 962 to pin B of jumper block 386, which in turn is connected to the DDS pin of ECM 379, allows NIR 962 to function as an OR gate treating pins 3 and 2 as the inputs. In FIG. 9 the clutch switch is omitted and changes in jumper configuration for jumper block 386 are shown. Now only pins A and C of the jumper block 386 are joined and form a connection from pin 4 of NSR 615 and pin 1 of CIR 661. In FIG. 10 the addition of the line 97AV connection from pin 4 of the NSR 615 to pin 3 of NIR 962 is shown.

The present invention allows power takeoff operation of auxiliary systems installed on motor vehicles while the vehicle is in neutral, but without the transmission lever being moved to the neutral position. The requirement that the transmission shift lever remain in neutral for cranking remains.

While the invention is shown in only one of its forms, it is not thus limited but is susceptible to various changes and modifications without departing from the spirit and scope of the invention.

What is claimed is:

1. Apparatus comprising:
    an engine controller responsive to the states of a remote engine speed control input signal and of a driveline disengage input signal for setting an engine throttle control output, and further responsive to the drive line disengage input for setting a value for an engine crank inhibit output signal;
    a transmission controller responsive to the states of an auto neutral enable switch and of a park brake for setting a value for an auto neutral output signal and further responsive to the position of the shift select lever for setting a value for shift select lever position output signal; and
    a logic network coupled for receiving the output signals from the transmission controller and the engine crank inhibit output signal from the engine controller as input signals and further coupled to apply a signal to the drive line disengage input of the engine controller, the logic network being responsive to the state of the auto neutral output signal for setting the value of the driveline disengage signal and being further responsive to the state of the shift position lever and the engine crank inhibit output signal for enabling a crank motor.

2. Apparatus as claimed in claim 1, wherein the logic network further comprises:

neutral indicator relay responsive to the auto neutral output signal indicative of the transmission being in neutral for putting a signal on the driveline disengage input indicating that the transmission is in neutral;
a neutral start relay connected to receive the shift lever position signal and responsive to a signal value for the shift select lever position output signal indicative of the shift select lever being in the neutral position for generating an enabling output; and
a crank inhibit relay connected to receive the engine crank inhibit output signal from the engine controller and the output of the neutral start relay for passing a crank enable signal a crank motor if the transmission is indicated to be neutral and the shift lever is in neutral.

3. Apparatus as claimed in claim 2, wherein the neutral indication relay is connected to the neutral start relay and is further responsive to the shift lever position output signal as passed from the neutral start relay for generating a driveline disengage signal indicating the transmission is in neutral.

4. A vehicle comprising:
    an engine;
    a throttle connected to the engine to control engine power output;
    an automatic transmission;
    an engine speed control switch positioned at a remote location on the vehicle;
    an engine controller connected to determine the state of the engine speed control switch and further connected to control the throttle;
    a park brake;
    an auto neutral enable switch;
    a gear select lever including a neutral position;
    a transmission controller connected to receive as inputs indication of the position of the park brake, the auto neutral enable switch and the gear select lever and responsive thereto for generating two outputs, a gear select lever position signal and a transmission state signal;
    a driveline disengage input to the engine controller;
    an engine crank inhibit output signal from the engine controller; and
    a logic network coupled for receiving the output signals from the transmission controller and the engine crank inhibit output signal from the engine controller as input signals and further coupled to apply a signal to the drive line disengage input of the engine controller, the logic network being responsive to the state of the auto neutral output signal for setting the value of the driveline disengage signal and being further responsive to the state of the shift position lever and the engine crank inhibit output signal for enabling a crank motor.

5. A vehicle as claimed in claim 4, wherein the logic network further comprises:
    neutral indicator relay responsive to the auto neutral output signal indicative of the transmission being in neutral for applying a high signal on the driveline disengage input;
    a neutral start relay connected to receive the shift lever position signal and responsive to a value of the shift select lever position signal indicative of the shift select lever being in the neutral position for generating an enabling output; and
    a crank inhibit relay connected to receive the engine crank inhibit output signal from the engine controller and the output of the neutral start relay for passing a crank enable signal to a crank motor if the transmission is indicated to be neutral and the shift lever is in neutral.

6. A vehicle as claimed in claim 5, further comprising:

an auxiliary system coupled to receive power from the engine.

7. A vehicle as claimed in claim 5, wherein the neutral indicator relay is connected to the neutral start relay and applies a signal indicating the shift lever position from the neutral start relay to the driveline disengage input of the engine controller absent an enabling transmission state signal.

8. Apparatus installed on a vehicle having an automatic transmission, a gear select lever, an engine, and an engine cranking motor, the apparatus allowing energization of an auxiliary system by the engine when the automatic transmission is in neutral and cranking of the engine when the gear select lever for the automatic transmission is positioned at neutral, the apparatus comprising:

means for placing the automatic transmission in a neutral state independent of the position of the gear select lever and generating a signal indicating the state of the automatic transmission;

a source of a signal indicating the position of the gear select lever;

a source of a request signal for increased engine power output for power takeoff operation;

an engine controller providing fuel flow control to the engine for setting power output in response to the state of the request signal for increased engine power output and further in response to the signal state on a driveline disengage signal input;

a relay connected to the means for generating a signal indicating automatic transmission state for setting a driveline disengage signal;

the engine controller being further responsive to the driveline disengage signal for setting a engine crank inhibit signal level; and a crank inhibit relay responsive to appropriate states of the engine crank inhibit signal and the signal indicating the position of the gear select lever for enabling engine cranking.

* * * * *